Oct. 23, 1934.  E. FORSELL  1,977,719
VISITING PANEL FOR PENAL INSTITUTIONS
Filed June 21, 1932   5 Sheets-Sheet 2
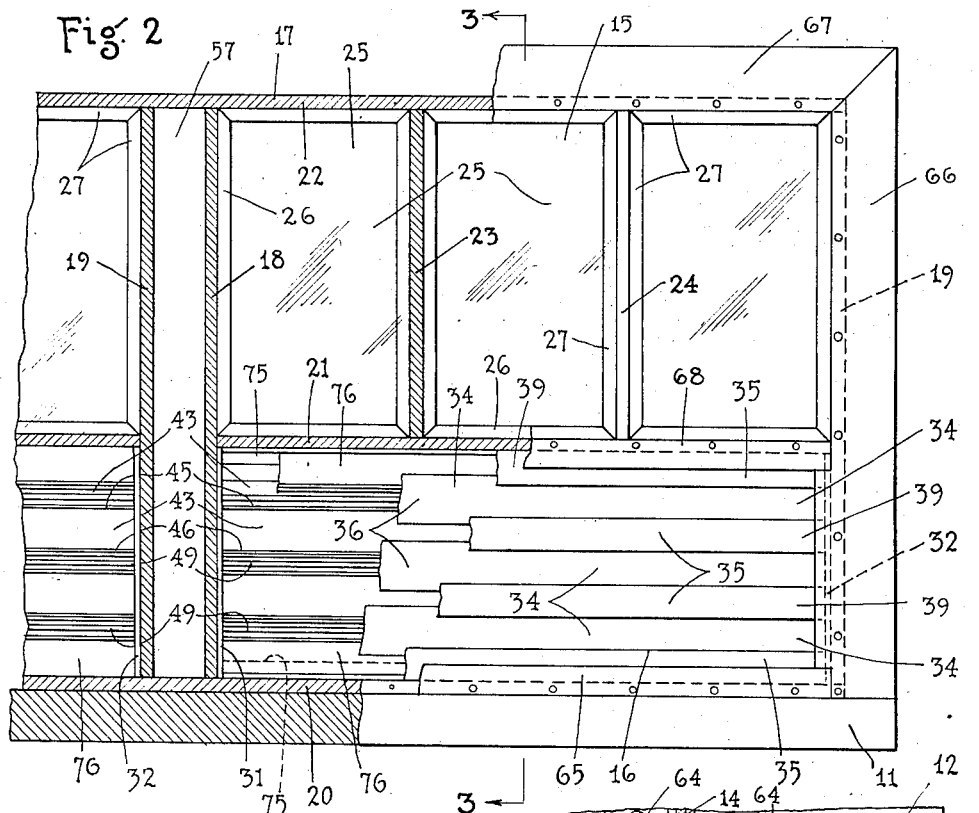
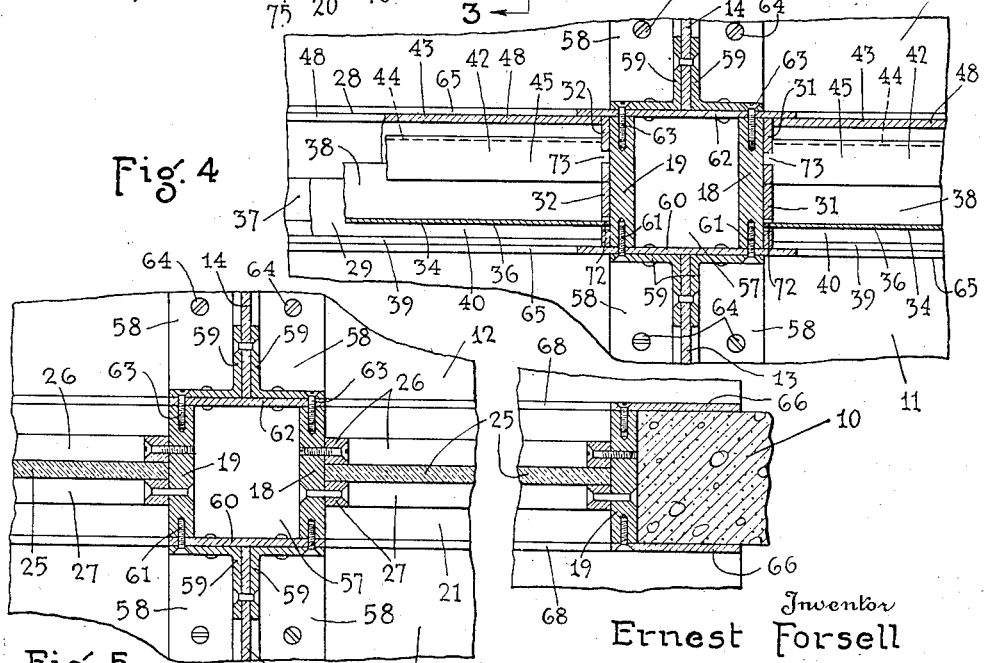
Inventor
Ernest Forsell
By Caswell & Lagaard
Attorneys Oct. 23, 1934.  E. FORSELL  1,977,719
VISITING PANEL FOR PENAL INSTITUTIONS
Filed June 21, 1932   5 Sheets-Sheet 3

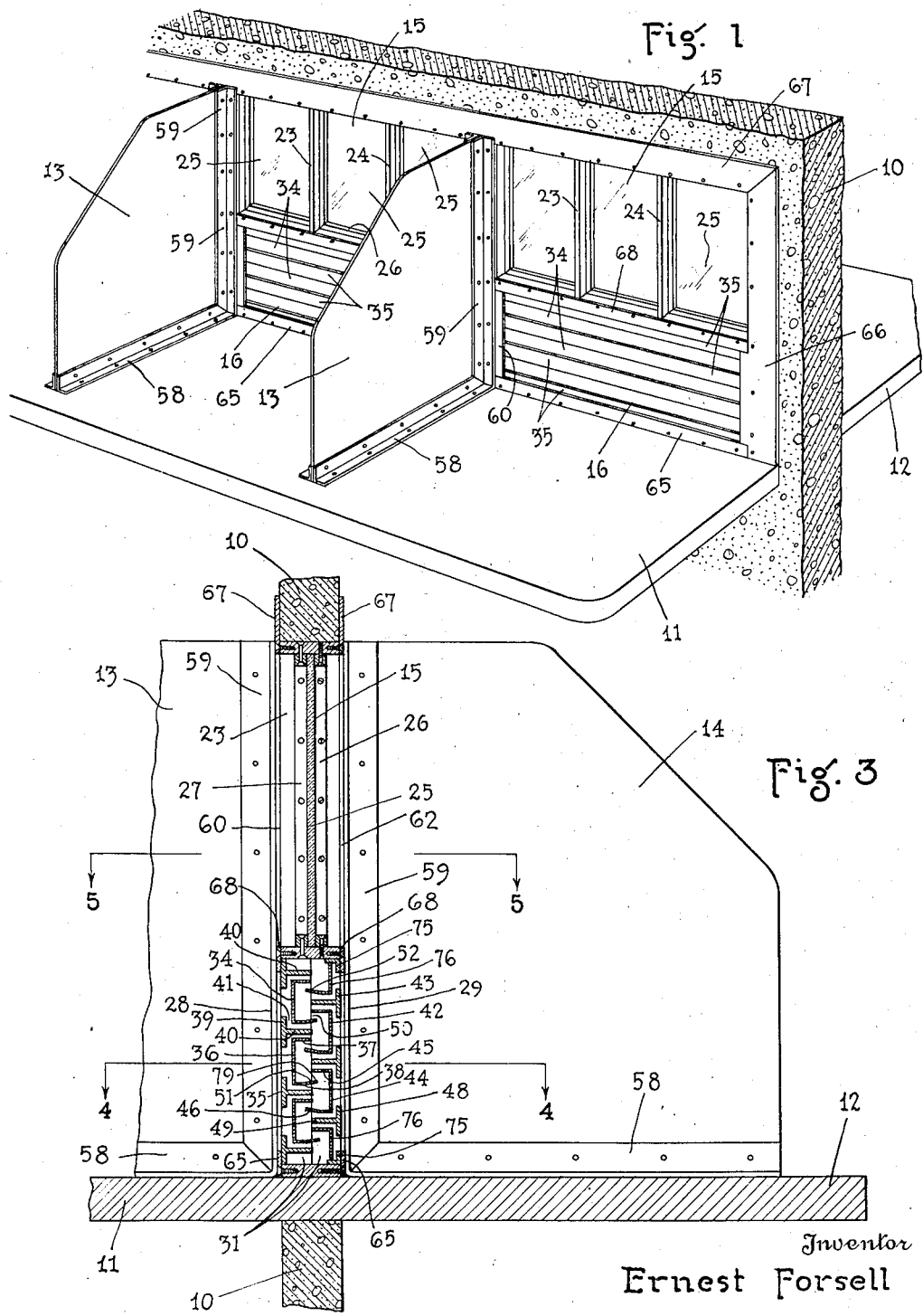

Inventor
Ernest Forsell
By Crowell & Lagaard
Attorneys

Oct. 23, 1934.  E. FORSELL  1,977,719
VISITING PANEL FOR PENAL INSTITUTIONS
Filed June 21, 1932  5 Sheets-Sheet 5

Inventor
Ernest Forsell

By Caswell & Lagaard
Attorneys

Patented Oct. 23, 1934

1,977,719

UNITED STATES PATENT OFFICE 1,977,719

VISITING PANEL FOR PENAL INSTITUTIONS

Ernest Forsell, Minneapolis, Minn., assignor to Thomas J. Stevenson, Minneapolis, Minn.

Application June 21, 1932, Serial No. 618,446

19 Claims. (Cl. 189—5)

My invention relates to visiting panels for use in penal institutions and has for its object to provide a panel through which visitors may readily converse with prisoners but through which no article of any sort may be passed.

An object of the invention resides in constructing the panel with a number of spaced juxtaposed members, each formed with angularly disposed elements arranged to provide a plurality of tortuous passages through the panel.

Another object of the invention resides in arranging said members in two series and in constructing the elements of one series so as to interlock with the elements of the other series.

A still further object of the invention resides in constructing the members with flanges extending toward one another to form the passages therebetween.

An object of the invention resides in arranging said flanges in a manner to extend beyond one another to form reversed passages extending from front to back of the panel.

A still further object of the invention resides in employing a number of channels arranged in two series with the flanges thereof directed toward one another and disposed in parallel relation.

An object of the invention resides in forming certain of said flanges with inwardly turned lips.

A feature of the invention resides in employing a series of T members disposed between the flanges of adjoining channel members, all of the flanges and other parts of said members being spaced from one another.

Another object of the invention resides in employing four members for each passage, said members being arranged to form in the passages a number of right angle turns.

A still further object of the invention resides in forming the ends of the flanges of certain of the adjoining members with lips bent toward the adjacent flanges to retain within the panel objects inserted into the passages therethrough.

An object of the invention resides in constructing the panel in two sections adapted to be separated from one another to give access to the interior of the panel.

A feature of the invention resides in providing a frame in which the sections of the panel are mounted and in removably supporting said sections within the frame.

An object of the invention resides in providing partitions separating the panel into booths and in providing a plate attached to said partitions for holding the sections within the frame.

Other objects of the invention reside in the novel combination and arrangement of parts and in the details of construction hereinafter illustrated and/or described.

In the drawings:

Fig. 1 is a perspective view of an installation showing a number of booths and illustrating an embodiment of my invention applied thereto.

Fig. 2 is an elevational view of the structure shown in Fig. 1.

Fig. 3 is an elevational sectional view taken on line 3—3 of Fig. 2.

Fig. 4 is a fragmentary plan sectional view taken on line 4—4 of Fig. 3 and drawn to a larger scale.

Fig. 5 is a fragmentary plan sectional view taken on line 5—5 of Fig. 3 and drawn to a larger scale.

Fig. 10 is an elevational sectional view taken on line 10—10 of Fig. 9.

Figure 11:
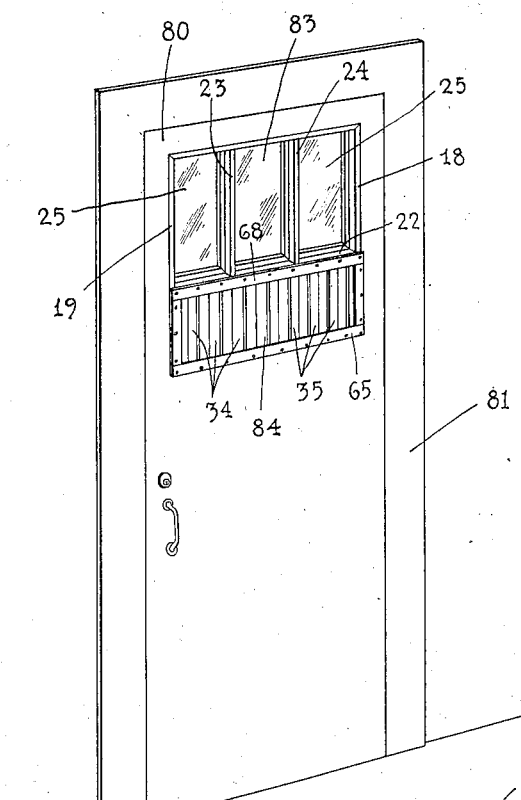
Fig. 11 is a perspective view showing the invention applied to a door.

In penal institutions the customary practice in allowing prisoners to converse with visitors has been to seat the prisoners at one side of a table and the visitors at the other side and to allow the prisoners and visitors to converse while so seated. Such methods require a great number of guards and in spite of all precautions, articles of various kinds such as files, narcotics, etc., are frequently delivered to the prisoners by the visitors. The present invention provides a visiting panel which may be installed in several different ways and through which sound may readily pass, but through which no object or article whatsoever can be passed.

In Figs. 1, 2, 3 and 4, I have shown my invention as applied to a wall indicated at 10 which divides the available visiting space into two parts, one into which the visitors are conducted, and the other in which the prisoners are conducted. This wall is provided on opposite sides thereof with tables 11 and 12 at which the prisoners and visitors are seated. For the purpose of illustration it has been assumed that the visitors are seated at table 11 and the prisoners at table 12. The wall 10 is divided on both sides thereof by a number of aligning partitions 13 and 14 which together with the tables and wall form corresponding booths 15 and 16 to which one prisoner and the visitor with whom he converses are assigned. In the wall 10 between the various partitions 13 and 14 are provided glass panels 15 through which the visitor and prisoner may view one another. Below these panels are provided speaking panels 16 through which sound is readily carried but through which no object may be passed from the visitor to the prisoner. Inasmuch as all the panels are identical in construction, only one of these panels will be described in detail.

For containing the panels 15 and 16, a frame 17 is employed which consists of stiles 18 and 19 and rails 20, 21 and 22. Muntins 23 and 24 are also employed which together with rail 21 sub-divide the upper portion of the panel 15 into smaller lights. All of the members from which the frame is constructed are preferably of bar material which are screwed together or which may be welded together at the corners or secured through mortises and tenons or in any other suitable manner.

The glass panels 15 consist of three panes of glass 25 best shown in Fig. 3 which are held in place between suitable stops 26 and 27 secured to the rails 21 and 22, the stiles 18 and 19 and the muntins 23 and 24. These stops are held in place upon the visitor's side of the wall 10 through rivets being thus permanently attached thereto. Upon the prisoner's side the same may be secured to the various parts of the frame through screws by means of which the stops may be removed and panes of glass replaced in the event that replacement thereof becomes necessary. The panes of glass 25 are preferably constructed of a bullet proof or nondestructible glass.

The speaking panel 16 is constructed in two sections indicated at 28 and 29 in Fig. 3, which sections are independent units separable from one another to give access to the interior of the panel. The two sections 28 and 29 are somewhat similarly constructed, section 28 being formed with a frame consisting of two stiles 31 and 32. Between the stiles 31 and 32 are placed a series of horizontal members 34 and 35 (Fig. 6) which are disposed adjacent one another and which extend from stile to stile to close the entire space between the same. The members 34 are constructed as channels, being formed with webs 36 and flanges 37 and 38. The members 35 are constructed as T's having backs 39 formed with flanges 40 issuing therefrom. The members 35 are arranged with the ends of the backs 39 disposed along the outer edges of the stiles 31 and 32 and with the flanges 40 thereof extending inwardly into the panel. The channel members 34 are similarly disposed with the webs 36 parallel to the backs 39 of members 35 and with the flanges 37 and 38 thereof extending inwardly into the panel. All of the members are arranged in spaced relation to one another to form passages 41 (Fig. 3) therebetween extending from one side of the panel toward the center thereof. In section 29 are members 42 and 43, which are identical with the members 34 and 35 of section 28, the members 42 being channel shaped and the members 43 T shaped. The members 42 are constructed with webs 44 having flanges 45 and 46 extending inwardly therefrom. The T members 43 are provided with backs 48 and inwardly extending flanges 49 located in the same manner with respect to the channel members 42 as the corresponding members of the section 28. The flanges 45 and 46 of the channel members 42 and the corresponding flanges 37 and 38 of the channel members 34 are so arranged that the flanges of one of the channels of one section straddle the adjacent flanges of two of the members of the opposite section. Due to this arrangement angles as indicated at 75 and 76 are employed as upper and lower members of the section 29 instead of T's and channels. The flanges of the members 34 and 42 overlie one another and by means of this construction, the passages 41 are reversed as indicated at 50 which makes it impossible to pass articles through the panel from one side of the wall to the other. The ends of the flanges 38 and 46 are formed with upwardly bent lips 51 and 52 which frustrate any attempt to pass articles through the panel from one side thereof to the other. These lips also serve to retain articles within the panel which may have been inserted into the passages 41.

Figure 6:
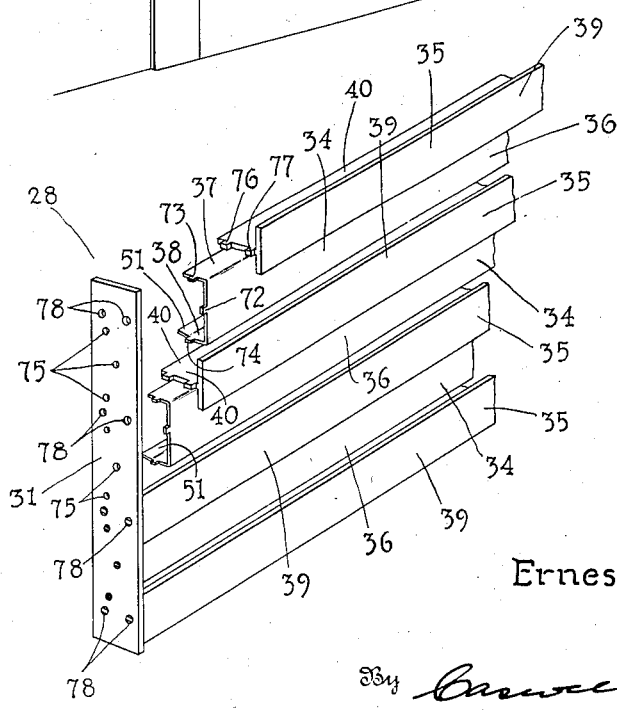
Fig. 6 is a perspective view showing the construction used in connecting the speaking panel to the supporting frame therefor.

The various members 34 and 35 of section 28 and the members 42 and 43 of section 29 may be held attached to the stiles 31 and 32 in any suitable manner. In Fig. 6, I have shown the members of the section 28 as secured to the stiles 31 and 32 by mortises and tenons. On the ends of the webs 36 and the flanges 37 and 38 of the members 34 are formed tenons 72, 73 and 74 which are adapted to fit into mortises 75 in the stiles. These mortises may be drilled holes properly spaced to receive said tenons. Likewise tenons 76 and 77 are formed on the ends of the flanges 40 of T members 35 which are adapted to fit into corresponding mortises 78 in the stiles 31 and 32. These various tenons may be riveted to hold said members attached to the frame members or if desired the same may be welded or otherwise secured in position. In the event that welding is used the mortises and tenons need only be used for the purpose of locating the various parts or if desired, the same may be completely dispensed with. Clip angles may also be employed to hold the parts attached to the stiles if desired.

In the installation of my invention in a penal institution a number of booths such as indicated at 55 and 56 are provided, the tables or counters 11 and 12 extending for a considerable distance along the wall 10. In such construction the rails 20 and 21 of the frames 17 are formed continuous and the stiles 18 and 19 of said frames lying adjacent one another are separated and connected to the rails 20 and 21 so as to form mullions 57 between each panel. The partitions 13 and 14 are attached to these mullions and to the tables 11 and 12 and for this purpose are provided along their vertical and horizontal edges with pairs of angles 58 and 59 which are securely riveted to said partitions. The angles 59 on the visitor's side of the wall 10 are riveted to plates 60 which in turn are secured through screws 61 to the stiles 18 and 19 of the mullions 57. These screws are preferably ground off after the same have been applied so as to present a smooth surface preventing removal of said screws after the partition has been secured in place. Upon the prisoner's side the angles 59 of the partitions 14 which are constructed in identically the same manner as the partitions 13 are riveted to a plate 62 which in turn is secured to the stiles 18 and 19 through screws 63. These screws are accessible from the prisoner's side and may be removed so that the panel may be taken off whenever it is desired to procure access to the interior of the panel. The partition 13 is permanently secured to the table 11 through angles 58 in any suitable manner while the partition 14 is secured to the table 12 by means of screws 64 which pass through the angles 58 and which may be removed as occasion demands. For the purpose of holding the panels 16 in place those portions of the plates 60 and 62 (Fig. 4) coextensive with said panels, are formed of a width slightly greater than that of the mullions 57. This causes said plates to overlie the stiles of the panels 16 and to hold the panel sections 28 and 29 in place. In addition to these members other plates 65, 66, 67 and 68 are employed which serve as casings and which are secured to the various members of the frame 17 in the same manner as the plates 60 and 62. These casings all serve to hold the sections of the panel in place and to trim the same.

In the installation of the invention, screws and removable parts are used at the prisoner's side of the wall to lend ready access to the interior of the panel structure and to permit of the ready removal of the panel sections, there being little if any danger of the unauthorized removal of parts from the prisoner's side of the structure. On the side of the wall at which the visitors are stationed the casings are permanently attached and the panels thereby rendered immovable from that side.

With my invention the passage of any object or substance whatsoever through the speaking panel is completely prevented. By means of the various T members 35, 43 inserted between the channels 34, 42 it is impossible to run any article such as a wire or the like through the panel for any purpose whatsoever. At the same time a low whisper can easily be heard through the speaking panel. By means of the glass panel 15 the visitor and prisoner may view each other and in this manner converse in exactly the same manner as if allowed complete freedom. In the event that articles are inserted between the various members forming the panel 16 they become lodged within the panel structure and may be subsequently removed when the panels are dissembled as previously described. With my invention free circulation of air through the panel may be had at relatively low velocities of travel. However, when the velocity of the air increases to an appreciable extent the tortuous passages through which the air must pass form a complete break thereby preventing the passage of a gas or similar fluid from the visitor to the prisoner. In penal institutions narcotics and other drugs have been smuggled to the prisoner by the spraying of a solution of the drug to the prisoner, which spray was collected by the prisoner in a handkerchief or in a similar article of clothing and subsequently dried out and recollected. The spraying of a drug in this manner is entirely prevented through my improved speaking panel.

Figure 7:
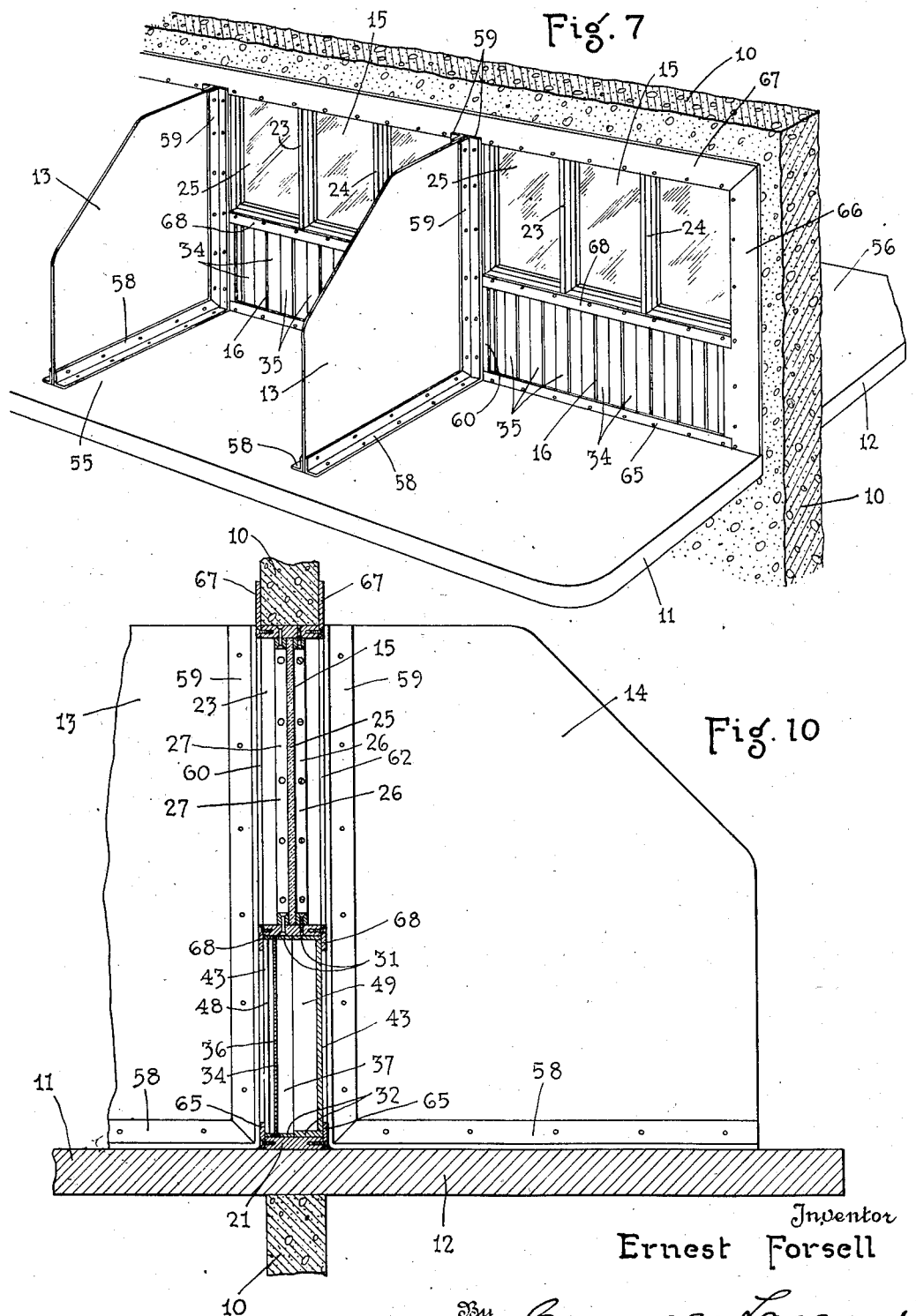
Fig. 7 is a view very similar to Fig. 1 of a modified form of the invention.
Figure 8:
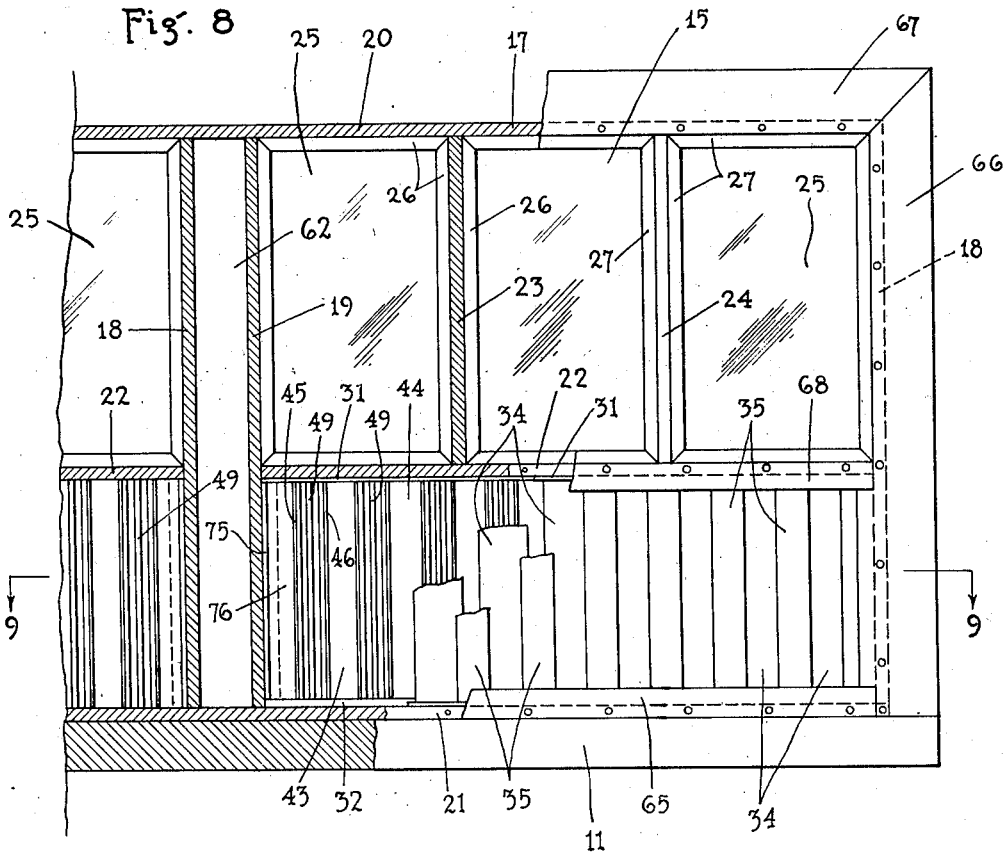
Fig. 8 is a front elevational view of the structure shown in Fig. 7.
Figure 9:
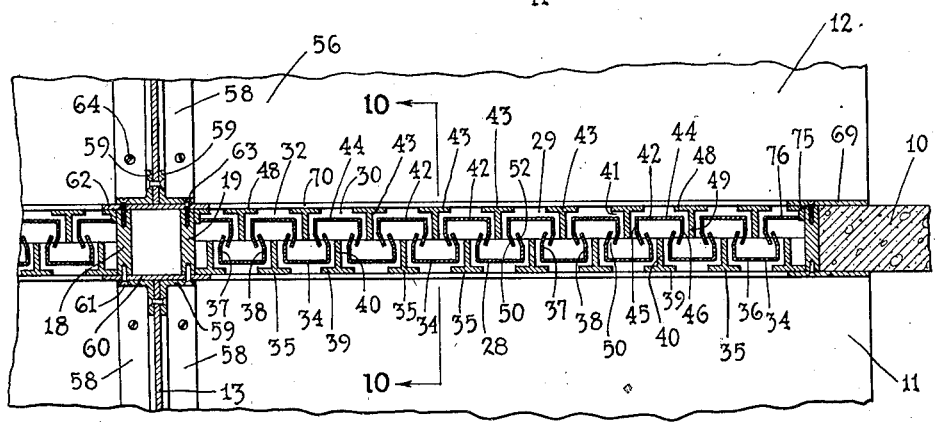
Fig. 9 is a plan sectional view taken on line 9—9 of Fig. 8.

In Fig. 1 the various members constituting the panels 16 have been illustrated as arranged in a horizontal position. If desired these members may be arranged vertically as shown in Fig. 7. When so arranged a greater number of said members are employed as disclosed in Figs. 8 and 9, which members are arranged in identically the same manner excepting that said members extend transversely of the panel instead of longitudinally thereof. Inasmuch as the construction employed in this form of the invention is practically the same as that shown in Fig. 1, the same reference characters will be used to describe similar parts. It will be noted, however, that the frame members 31 and 32 in this form of the invention lie along the rails 21 and 22 instead of the stiles 18 and 19.

In Fig. 11, I have shown a panel constructed in accordance with my invention applied to a door. The panel so constructed prevents the passing of any article therethrough. In said Fig. 11, the door is indicated at 80 and the casing therefor at 81. This door is provided with a glass panel 83 and a speaking panel 84, which are constructed in the manner disclosed in Fig. 7. In the event that articles are inserted into the panel 84 a section thereof may be taken apart and the articles removed therefrom as previously described.

The advantages of my invention are manifest. Visitors and prisoners are permitted to view one another and to converse readily without having physical contact with one another and without being able to pass objects or articles from one to the other. The speaking panel is readily taken apart for examination and repair and for the purpose of removing articles which may be inserted into the same. The sections of the speaking panels, fabricated at the factory, may be readily assembled in proper relation within the frame therefor after said frame has been installed in its supporting structure. With my invention even the passage of drugs by spraying is prevented. My invention can be constructed at a nominal expense. Where penal institutions are equipped with my invention a minimum number of guards is required in the handling of the prisoners and visitors. With my invention far greater safety may be had in penal institutions and danger from riots and outbreaks is greatly lessened.

Changes in the specific form of my invention, as herein disclosed, may be made within the scope of what is claimed without departing from the spirit of my invention.

Having described my invention, what I claim as new and desire to protect by Letters Patent is:

1. In a visiting panel, a series of channel members arranged in spaced order with the flanges thereof adjacent one another, a second series of channel members arranged in similar order and with the flanges thereof interlocking with the flanges of said first named channel members, T members disposed adjacent said channel members with the backs thereof spaced from and parallel with the webs of said channel members and with the flanges thereof disposed between and spaced from the flanges of said channel members and means for holding said members in position.

2. In a visiting panel, a series of channel members arranged in spaced relation with the flanges adjacent one another, a series of T members arranged with the flanges thereof between the flanges of said channel members other members overlying the ends of the flanges of said channel and T members to form tortuous passages extending from front to back of the panel and means for holding said members in position.

3. In a visiting panel, a series of members arranged in spaced relation and having correspondingly disposed parallel flanges with free edges, a second series of spaced members provided with flanges disposed between the flanges of the first series and extending parallel thereto, said second named flanges also having free edges, some of said flanges being bent at their free edges to form lips extending toward the other flanges and means for holding said members in position.

4. In a visiting panel, a horizontally disposed member formed with a horizontal flange, a second horizontal member formed with a second horizontal flange overlying said first horizontal flange and spaced therefrom, and an upwardly bent lip formed on said first named flange extending toward said second named flange and means for holding said members in position.

5. In a visiting panel, a series of channel members provided with flanges having free edges, said channel members being arranged in spaced order with the flanges thereof adjacent one another, a second series of channel members similar in construction and arranged in similar order, the channel members of one series being situated adjacent and opposite to the channel members of the other series, said channel members being disposed with the webs outermost and with the flanges thereof interlocking with the flanges of the opposed channel members, the channel members of each series being spaced from the channel members of the other series to provide tortuous passages extending from front to back of said panel, and means for holding said flanges in position.

6. In a visiting panel, a series of similarly shaped separate members arranged in predetermined order and spaced from one another, a second series of other members having flanges, said flanges being disposed between said first named members and forming in conjunction therewith tortuous passageways through the panel, and means for holding said two series of members in their coactive relationship.

7. In a visiting panel, a series of similarly shaped separate members arranged in predetermined order and spaced from one another, a second series of other members having flanges, said flanges being disposed between said first named members and forming in conjunction therewith tortuous passageways through the panel, mounting means for said first series of members, other mounting means for said second series of members, and means coacting with the mounting means of both series of said members to hold the members of one series in coactive relationship with respect to the said members of the other series.

8. In a visiting panel, a frame, a panel section constructed with a plurality of members having spaced flanges projecting from the plane of the panel, said section being disposed within said frame, a second panel section constructed with a plurality of members having spaced flanges projecting from the plane of the panel, said second panel being received within said frame with the flanges thereof facing the flanges of the first panel and disposed therebetween to form tortuous passages through the panel and means for holding the sections in the frame and in coactive relationship.

9. In a visiting panel, a panel section comprising two end supports, a plurality of spaced members secured to said end supports, said members having flanges thereon projecting from said members, a second panel section movable toward and from the first panel section, said second panel section comprising two end supports, a plurality of members secured to said end supports, flanges thereon projecting from said second named members, the flanges of both of said panel sections being adapted to be arranged to cause the flanges of one section to be disposed between the flanges on the other section and shoulders on the end supports of said second panel section for limiting the movement of the second panel section toward the first panel section to maintain the edges of the flanges of one panel section spaced from the flanges of the other panel section, and means for holding the sections in coactive relationship.

10. In a visiting panel, a panel section comprising two end supports, a plurality of spaced members secured to said end supports, said members having flanges thereon projecting from said members, a second panel section movable toward and from the first panel section, said second panel section comprising two end supports, a plurality of members secured to said end supports, flanges projecting from said second named members, the flanges of both of said panel sections being adapted to be arranged to cause the flanges of one section to be disposed between the flanges on the other section and abutting shoulders on said end supports for limiting the movement of the second panel section toward the first panel section to maintain the edges of the flanges of one panel section spaced from the edges of the flanges of the other panel section, and means for holding the members in coactive relationship.

11. In a visiting panel, a member having an elongated horizontally extending plate-like part disposed in a vertical plane, a flange extending inwardly from said part at the lower edge thereof, a second member of similar construction vertically spaced from said first member, means forming in conjunction with said members a tortuous passageway through the panel, one of said flanges forming a shelf on which articles inserted between the members may lodge, and means for holding the members in coactive relationship.

12. In a visiting panel, means forming two spaced facings having openings therein through which sound may travel, shelves extending inwardly into the panel from said facings, means forming in conjunction with said shelves tortuous passageways through the panel and means for holding the facings in coactive relationship, said shelves being located in proximity to the upper edges of the openings and serving to trap articles inserted into the openings.

13. In a visiting panel, a series of members arranged in spaced relation to one another and having flanges projecting therefrom, a second series of members arranged in spaced relation to one another and to said first named members and having flanges projecting therefrom and extending in the same direction as said first named flanges and disposed between said first named flanges, other members overlying the ends of the flanges of said first and second members and forming in conjunction therewith tortuous passageways through the panel, and means for holding said members in coactive relationship.

14. In a visiting panel, a series of members arranged in spaced relation and having flanges projecting therefrom, a series of plate-like members arranged in spaced relation to one another and to said first named members and covering the spaces between said first named members on the sides thereof opposite said flanges, and other members overlying the ends of the flanges of said first named members and spaced from one another and said first named members, all of said members forming in conjunction tortuous passageways extending through the panel and means for holding said members in coactive relationship.

15. In a visiting panel, means forming two spaced planiform facings having spaced elongated openings therein through which sound may travel, flanges issuing inwardly from said facings between openings, the flanges on one facing being spaced from the opposite facing and the flanges thereon, and the flanges on the other facing being likewise spaced from the first facing and the flanges thereon and means for holding said facings in coactive relationship.

16. In combination, two juxtaposed casings providing a mullion therebetween, stops secured to said casings on one side thereof, a removable panel in each of said casings held from movement in one direction by said stops, a partition on the other side of said casings and extending up to said mullion, and a removable stop carried by said mullion for holding the panels from movement in the opposite direction, said partition securing said removable stop against removal.

17. In combination, a visiting panel comprising two sections, each consisting of spaced members, the members of one section being adapted to be positioned with respect to the members of the other section to form tortuous passageways through the panel, a frame for supporting said panel sections in coactive relationship and means for removably holding one of said panel sections within the frame.

18. A visiting panel comprising two sections, each consisting of a number of spaced members, separate means for holding the members of each section in spaced relation, the members of one of said sections having elements coacting with similar elements of the other section to form tortuous passageways through the panel, said sections being separable to give access to the elements of said members, and means for detachably securing said sections together.

19. A visiting panel comprising two sections, each consisting of a number of spaced members, separate means for holding the members of each section in spaced relation, all of said members having flanges extending toward the members of the opposite section, the flanges of one section being disposed in spaced staggered relation with respect to the flanges of the other section to form passageways extending through the panel, said sections being separable to give access to the flanges of said members, and means for detachably securing said sections together.

ERNEST FORSELL.